Figure 1:
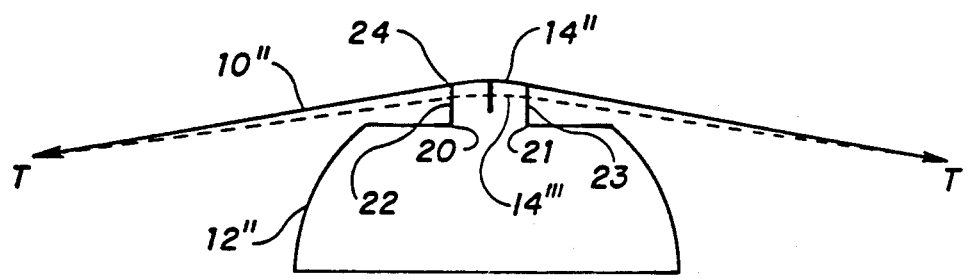

United States Patent [19]

Favrou et al.

[11] Patent Number: 4,875,129
[45] Date of Patent: Oct. 17, 1989

[54] INLINE MAGNETIC HEAD ASSEMBLY FOR USE IN A CASSETTE LOADED RECORDER

[75] Inventors: John M. Favrou, Del Mar, Calif.; Christopher A. Lacey, Willimantic, Conn.; George W. Brock, La Jolla, Calif.

[73] Assignee: Eastman Kodak Co., Rochester, N.Y.

[21] Appl. No.: 274,507

[22] Filed: Nov. 21, 1988

Related U.S. Application Data

[63] Continuation of Ser. No. 138,764, Dec. 28, 1987, abandoned.

[51] Int. Cl.⁴ ................................................. G11B 5/22
[52] U.S. Cl. .................................................... 360/122
[58] Field of Search ........................................ 360/122

[56] References Cited

U.S. PATENT DOCUMENTS 3,737,582  6/1973  De Moss ............................ 360/122
4,636,898  1/1987  Suzuki et al. ...................... 360/122

FOREIGN PATENT DOCUMENTS 57-200922  12/1982  Japan ................................. 360/122
59-16119   1/1984  Japan ................................. 360/122
59-213013  12/1984  Japan ................................. 360/122
61-5408    1/1986  Japan ................................. 360/122
61-80607   4/1986  Japan ................................. 360/122

OTHER PUBLICATIONS

IBM/TDB, vol. 19, No. 5, Oct. 1976, 360/122, "Stabilized Wasp-Waist Head", by Nelson et al.

*Primary Examiner*—John H. Wolff
*Attorney, Agent, or Firm*—Daniel Robbins

[57] ABSTRACT

In a recorder having two inline heads, such as a record head followed by a reproduce head, it is necessary to insure adequate tape wrap angle at the transducing element of each head. Because the tape is spanned between the two inline heads, the tape leaves the apex of one head at a zero wrap angle and arrives at the apex of the second head with a zero wrap angle. The invention provides outriggers on each head assembly which guide the tape, and teaches placing each transducing element off the apex of its head assembly to maintain adequate wrap angles at the transducing elements of each inline head. The outriggers are provided with slots which skive entrapped air to prevent tape "flying" with attendant loss of contact with the transducing elements. The contours of the outriggers and the lands on which the transducing elements of each head assembly are located form constant area profiles to provide constant wear characteristics for the head assemblies.

5 Claims, 2 Drawing Sheets

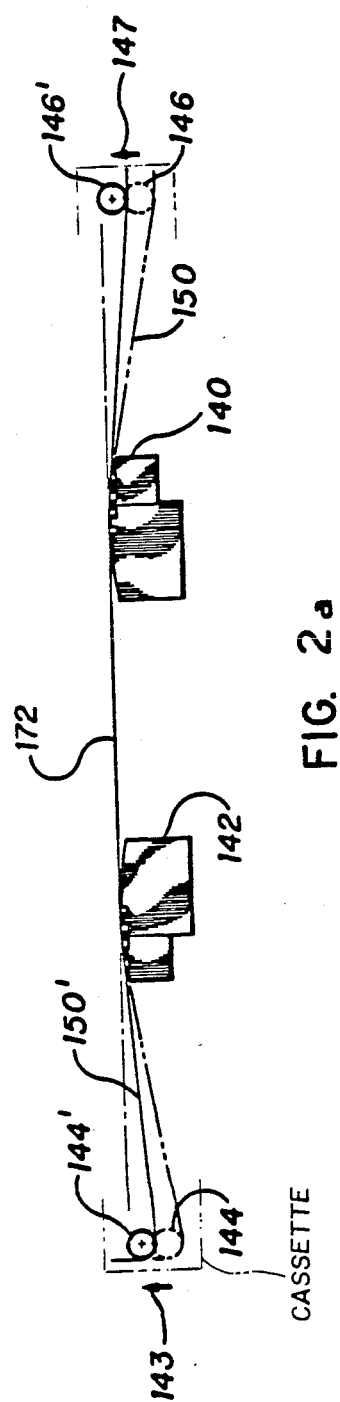
FIG. 2.a
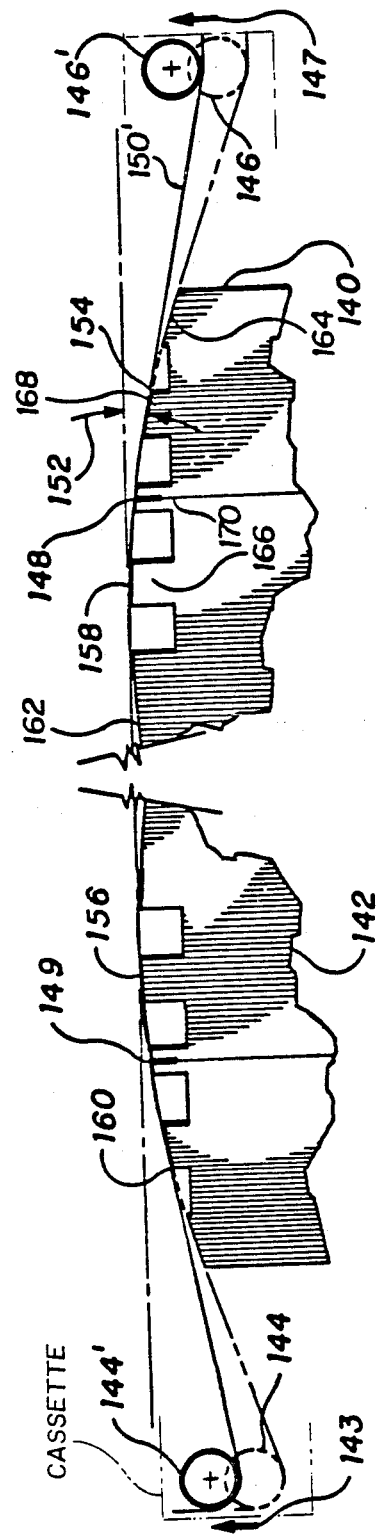
FIG. 2.b

INLINE MAGNETIC HEAD ASSEMBLY FOR USE IN A CASSETTE LOADED RECORDER

BACKGROUND OF THE INVENTION

This application is a continuation of application Ser. No. 138,764, filed Dec. 28, 1987. Related co-pending commonly assigned applications are application Ser. No. 138,756, filed Dec. 28, 1987, and application Ser. No. 138,788, filed Dec. 28, 1987, and refiled as continuation application.

1. Field of the Invention

This invention relates to the contour of a magnetic head assembly, and in particular to two inline head assemblies that provide improved contact at the magnetic head-magnetic tape interface of a cassette loaded recorder.

The invention, as well as the prior art, will be described with reference to the drawings of which:

FIG. 1 illustrates a magnetic head contour over which the invention provides improvement, FIGS. 2a, 2b illustrate magnetic tape in contact with two in-line magnetic head assemblies having contours in accordance with the teaching of the invention under various cassette guiding conditions.

2. Description of the Prior Art

The contact between the magnetic head and the magnetic tape is crucial in determining the performance of a magnetic tape recording system. During recording it is essential that the gap of the head, which is the source of the recording flux, be in intimate contact with the tape to effect efficient signal transfer, and during playback intimate contact is essential to provide effective coupling of the magnetic field from the tape to the playback head. While adequate contact is essential at all wavelengths, it is particularly important at short recorded wavelengths due to the well known spacing loss effect which becomes increasingly severe as the wavelength decreases.

An improved head contour eliminates problems of increase in size of the contact region and "flying" of the tape as described in copending and commonly assigned U.S. patent application 138,756 filed Dec. 28, 1987 entitled "Magnetic Head With Constant Area Wear Profile" in the name of R. J. McClure. Referring to FIG. 1, a radiused head surface 12" is provided with shoulders 20, 21 which define the head-tape contact region 14". The tape 10" engages the contact region 14" at the edge of the plane 22 comprising one face of the shoulder 20. It remains in contact with the head while traversing the region 14", and exits from the contact region 14" at the plane 22' which comprises a face of the shoulder 23. The edge 24 at which the tape engages the contact region 14" skives any entrained air which may be adherent to the tape prior to the tape contacting the head at 14'. Removal of this air layer significantly improves head/tape contact over the entire surface of the head by elimination of the air film required to support tape "flying".

Additionally, McClure teaches contouring the head surface so the tape exerts constant pressure at all points of the head/tape contact region as the tape traverses the head in the recording system. The industry practice has been to set the radius of the head at about 0.125", but, in general, at this radius the pressure of the tape is not uniformly distributed over the head surface. Experience shows that the radius and the contour of the head change as the head wears due to tape abrasiveness. It will be appreciated that in areas where the contact region experiences "high" pressure the head will wear faster than it will in areas that experience "low" pressure. The head will wear so as to assume a contour where the pressure is uniform across the entire surface. According to McClure's teaching, however, if the head contour is initially shaped so that all points of contact of the head surface are under identical pressure during normal operation, and the sides of the head structure are parallel to the pressure direction, then head wear will be uniform over the life of the head and the contour at the region of contact 14''' will maintain the contour of the original region of contact 14''. The optimum contour has been designated as a "constant area profile" surface since it provides a constant area head/tape contact region over the life of the head.

Co-pending and commonly assigned application Ser. No. 138,788 filed Dec. 28, 1987 in the names of C. A. Lacey et al, describes a single head assembly having a constant area profile contour in combination with outriggers which maintain the wrap angle between head and tape in a cassette loaded recorder.

SUMMARY OF THE INVENTION

In a recorder having two inline heads, such as a record head followed by a reproduce head, it is necessary to insure adequate tape wrap angle at the transducing element of each head. Because the tape is spanned between the two inline heads, the tape leaves the apex of one head at a zero wrap angle and arrives at the apex of the second head with a zero wrap angle. The invention provides outriggers on each head assembly which guide the tape, and teaches placing each transducing element off the apex of its head assembly to maintain adequate wrap angles at the transducing elements of each inline head. The outriggers are provided with slots which skive entrapped air to prevent tape "flying" with attendant loss of contact at the transducing elements. The contours of the outriggers and the lands on which the transducing elements of each head assembly are located form constant area profiles to provide constant wear characteristics for the head assemblies.

DESCRIPTION OF THE INVENTION

An embodiment of the invention, where more than one head is located in the tape path as, for example, the case of separate record and playback heads, is illustrated in FIGS. 2a, 2b. Referring to FIG. 2a, guides 144, 146 are shown in their nominal positions with tape 150 contacting both head assembly 140, and also a second head assembly 142. If the guides 144, 146 are displaced in the direction of arrows 143, 147 to positions 144', 146', the tape path 150 is displaced to tape path 150'. By referring to FIG. 2b, where the components of FIG. 2a are shown in greater detail, the effects of the cassette guide displacements may be more clearly appreciated. Considering the head structure 140, two pair of outriggers 162, 166 and 168, 164 are provided. A transducing element 148 is located on a land 170. It will be noted that the tape span 172 (FIG. 2a) between the head assemblies 140, 142 causes the tape to enter and to leave the outrigger 166 (FIG. 2b) at almost zero wrap angles. Resultantly, the normal force of the tape 150' against the outrigger 166 is very low and if a transducing element were located on the outrigger 166 the contact pressure would be insufficient to ensure reliable performance. The transducing element 148, therefore, is located on the land 170 where there is sufficient wrap and attendant normal force due to the tape first contacting either outrigger 162 or 166 and later contacting either outrigger 168 or 164, to guarantee adequate tape to transducing element contact. It will be appreciated that because of the symmetry of the placement of the head assemblies 140, 142, that a similar argument is applicable to the location of the magnetic element 149 on the head assembly 142.

The sides of the outriggers and the center lands provide edges for skiving air particles adherent to the tape approaching the important contact area, as previously described. It will be noted that the symmetry of the head structure insures the air skiving is effective for either direction of tape travel.

The invention has been described in detail with particular reference to preferred embodiments thereof, but it will be understood that variations and modifications can be effected within the spirit and scope of the invention. For example, the teachings of the invention may be applied to the magnetic head assemblies of other magnetic recorders not employing cassettes, such as reel to reel recorders or loop recorders not having precisely positioned tape guiding elements.

What is claimed is:

1. In a recording system including first and second magnetic head assemblies, the improvement comprising:
   a. means for transporting a recording medium over said first and said second magnetic head assemblies in sequence, said means including a span of said medium between said first and said second head assemblies,
   b. first transducing element and second transducing element located on first and second lands of said first and said second head assemblies respectively,
   c. means external to said first and to said second magnetic head assemblies for guiding said recording medium at nominal wrap angles relative to said first and said second transducing elements,
   d. said first magnetic head assembly further comprising
      a first pair of outriggers for contacting said recording medium before said recording medium contacts said first land having said first transducing element located thereon, wherein at least one of said first pair of outriggers contacts said medium,
      a second pair of outriggers for contacting said recording medium after said recording medium contacts said first land having said first transducing element located thereon, wherein at least one of said second pair of outriggers supports one end of said span of said medium,
   e. said second magnetic head assembly further comprising
      a third pair of outriggers for contacting said recording medium before said recording medium contacts said second land having said second transducing element located thereon, wherein at least one of said third pair of outriggers supports the other end of said span of said medium,
      a fourth pair of outriggers for contacting said recording medium after said recording medium contacts said second land having said second transducing element located thereon, wherein at least one of said fourth pair of outriggers contacts said medium,
      wherein said first pair of outriggers, said first land, and said second pair of outriggers comprise the contour of a first constant area profile, and said third pair of outriggers, said second land, and said fourth pair of outriggers comprise the contour of a second constant area profile.

2. The recording system of claim 1, wherein the apex of said first magnetic head assembly is located on said second pair of outriggers.

3. The recording system of claim 1, wherein the apex of said second magnetic head assembly is located on said third pair of outriggers.

4. The recording system of claim 1 further comprising a removable cassette, and wherein said recording medium is located in said removable cassette.

5. The recording system of claim 4, wherein said means external to said first and to said second magnetic head assemblies for guiding said recording medium are guides within said cassette.

* * * * *

UNITED STATES PATENT AND TRADEMARK OFFICE
CERTIFICATE OF CORRECTION

PATENT NO. : 4,875,129
DATED : October 17, 1989
INVENTOR(S) : J. M. Favrou, C. A. Lacey, G. W. Brock It is certified that error appears in the above-identified patent and that said Letters Patent is hereby corrected as shown below:

| | |
|---|---|
| Column 3, line 32 | after "first", add --curved-- |
| Column 3, line 32 | after "second", add --curved-- |
| Column 3, line 36 | after "respectively", add --with said transducer elements being located off the apex of their respective lands-- |
| Column 4, line 40 | after "located in", delete "said" and substitute therefor --a-- |
| Column 4, line 44 | after "within", delete "said" and substitute therefor --a-- |

Signed and Sealed this

Tenth Day of April, 1990

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,875,129
DATED : October 17, 1989
INVENTOR(S) : Favrou et al

It is certified that error appears in the above-identified patent and that said Letters Patent is hereby corrected as shown below:

Column 3, line 32, after "first", delete "curved"

Column 3, line 32, after "second", delete "curved"

Column 3, line 34, after "first", add --curved--

Column 3, line 34, after "second", add --curved--

Column 4, line 40, after "located in", delete "said" and substitute therefor --a--

Column 4, line 44, after "within", delete "said" and substitute therefor --a--

This Certificate supersedes Certificate of Correction issued April 10, 1990.

Signed and Sealed this

Twelfth Day of February, 1991

Attest:

HARRY F. MANBECK, JR.

*Attesting Officer*       Commissioner of Patents and Trademarks